(12) United States Patent
Ativanichayaphong et al.

(10) Patent No.: US 7,739,117 B2
(45) Date of Patent: Jun. 15, 2010

(54) METHOD AND SYSTEM FOR VOICE-ENABLED AUTOFILL

(75) Inventors: Soonthorn Ativanichayaphong, Boca Raton, FL (US); Charles W. Cross, Jr., Wellington, FL (US); Gerald M. McCobb, Delray Beach, FL (US)

(73) Assignees: International Business Machines Corporation; Nuance Communications, Inc., Burlington, MA (US)

( * ) Notice: Subject to any disclaimer, the term of this patent is extended or adjusted under 35 U.S.C. 154(b) by 1008 days.

(21) Appl. No.: 10/945,112

(22) Filed: Sep. 20, 2004

(65) Prior Publication Data

US 2006/0064302 A1 Mar. 23, 2006

(51) Int. Cl.
*G10L 11/00* (2006.01)
*G10L 15/00* (2006.01)
*G06F 3/00* (2006.01)
*G06F 11/30* (2006.01)

(52) U.S. Cl. .................... 704/270.1; 704/231; 704/270; 713/193; 715/744

(58) Field of Classification Search ............. 704/270.1; 713/193; 715/507, 744
See application file for complete search history.

(56) References Cited

U.S. PATENT DOCUMENTS

2002/0093530 A1 7/2002 Krothapalli et al.
2002/0165719 A1* 11/2002 Wang et al. .............. 704/270.1
2003/0028792 A1 2/2003 Plow et al.
2003/0140113 A1 7/2003 Balasuriya

OTHER PUBLICATIONS

XHTML+Voice Profile 1.2, http://www.voicexml.org/specs/multimodal/x+v/12/spec.html; Mar. 16, 2004.*
U.S. Appl. No. 10/849,642, filed May 19, 2004, Cross, et al.
U.S. Appl. No. 10/870,517, filed Jun. 17, 2004, Ativanichayaphong, e.
"Naturally Speaking Professional", Image Management, LLC, viewed Feb. 28, 2004.
"OmniForm Premium 5.0", ScanSoft, 2004.
Axelsson, J., et al., "XHTML +Voice Profile 1.2", Mar. 16, 2004.

* cited by examiner

*Primary Examiner*—David R Hudspeth
*Assistant Examiner*—Justin W Rider
(74) *Attorney, Agent, or Firm*—Wolf, Greenfield & Sacks, P.C.

(57) ABSTRACT

A computer-implemented method and system are provided for filling a graphic-based form field in response to a speech utterance. The computer-implemented method includes generating a grammar corresponding to the form field, the grammar being based on a user profile and comprising a semantic interpretation string. The method further includes creating an auto-fill event based upon the at least one grammar and responsive to the speech utterance, the auto-fill event causing the filling of the form field with data corresponding to the user profile. The system includes a grammar-generating module for generating a grammar corresponding to the form field, the grammar being based on a user profile and comprising a semantic interpretation string. The system also includes an event module for creating an auto-fill event based upon the at least one grammar and responsive to the speech utterance, the event causing the filling of the form field with data corresponding to the user profile.

17 Claims, 7 Drawing Sheets

METHOD AND SYSTEM FOR VOICE-ENABLED AUTOFILL

BACKGROUND

1. Field of the Invention

The present invention relates to multimodal browsers and voice servers and, more particularly, to voice-enabled multimodal applications for multimodal browsers and voice servers.

2. Description of the Related Art

Recent developments, many founded on the data-description eXtensible Markup Language (XML), have given rise to new Web-based applications including multimodal interfaces or browsers. A multimodal browser allows a user to access multimodal content, content that can be both graphical and audible. Traditionally, the user accessed Web content utilizing graphic input from a keyboard or manually directed screen-pointer entry. Later, the user also was been able to utilize speech input. More recently, the user has been able to access Web content through multimodal interfaces which permit the use of both graphic and speech inputs.

One type of multimodal browser is provided by the eXtensible Hypertext Markup Language (XHTML or XML)+Voice eXtensible markup language (VXML), also denoted more succinctly as the X+V markup language. The X+V markup language extends the traditional graphic browser to include spoken interactions. The X+V markup language integrates XHTML and XML-events technologies with XML vocabularies that were developed as part of the World Wide Web Consortium (W3C) Speech Interface Framework. The integration includes voice modules that support speech synthesis, speech dialogs, command and control applications, and speech grammars. Voice handlers can be attached to XHTML elements and respond to specific Document Object Model (DOM) events of a visual browser.

Notwithstanding these developments, a number of user desirable capabilities are not present in conventionally implemented multi-modal interfaces, such as a user-friendly capability to fill form fields based upon speech utterances. Forms requiring user input have become commonplace. For example, users must commonly complete a form before being granted access privileges to enter a secure Web site. Inputting form information can be tedious, time consuming, and even frustrating. This can be especially true for a user who repetitively accesses content from various Web sites, each of which requires form-based input of user data before access is allowed. Moreover, the user may be using a device to access Web content that has limited or inconvenient input options. For example, a telephone, mobile phone, personal digital assistant (PDA), or similar type device often includes only a limited array of keys, a very small keypad, or nothing other than a voice input mechanism. It is desirable, therefore, that multimodal browsers be extended to provide an efficient way of voice enabling the automatic filling of form fields.

SUMMARY OF THE INVENTION

The present invention provides a computer-implemented method of automatically filling a form field in response to a speech utterance. The method can include the step of generating at least one grammar corresponding to the form field. The grammar can be based on a user profile and can include a semantic interpretation string. The method further can include the step of creating an event. The event can be based upon the at least one grammar and can be responsive to the speech utterance. The event can cause the filling of the form field with data corresponding to the user profile.

According to another embodiment, the present invention provides a computer system for automatically filling a form field in response to a speech utterance. The system can include a grammar-generating module that generates at least one grammar corresponding to the form field. The grammar can be based on a user profile and can comprise a semantic interpretation string. The computer system also can include an event module that creates an event that is based upon the at least one grammar and that is responsive to the speech utterance. The event can induce the filling of the form field with data corresponding to the user profile.

BRIEF DESCRIPTION OF THE DRAWINGS

There are shown in the drawings, embodiments that are presently preferred; it being understood, however, that the invention is not limited to the precise arrangements and instrumentalities shown.

DETAILED DESCRIPTION OF THE INVENTION

Figure 1:
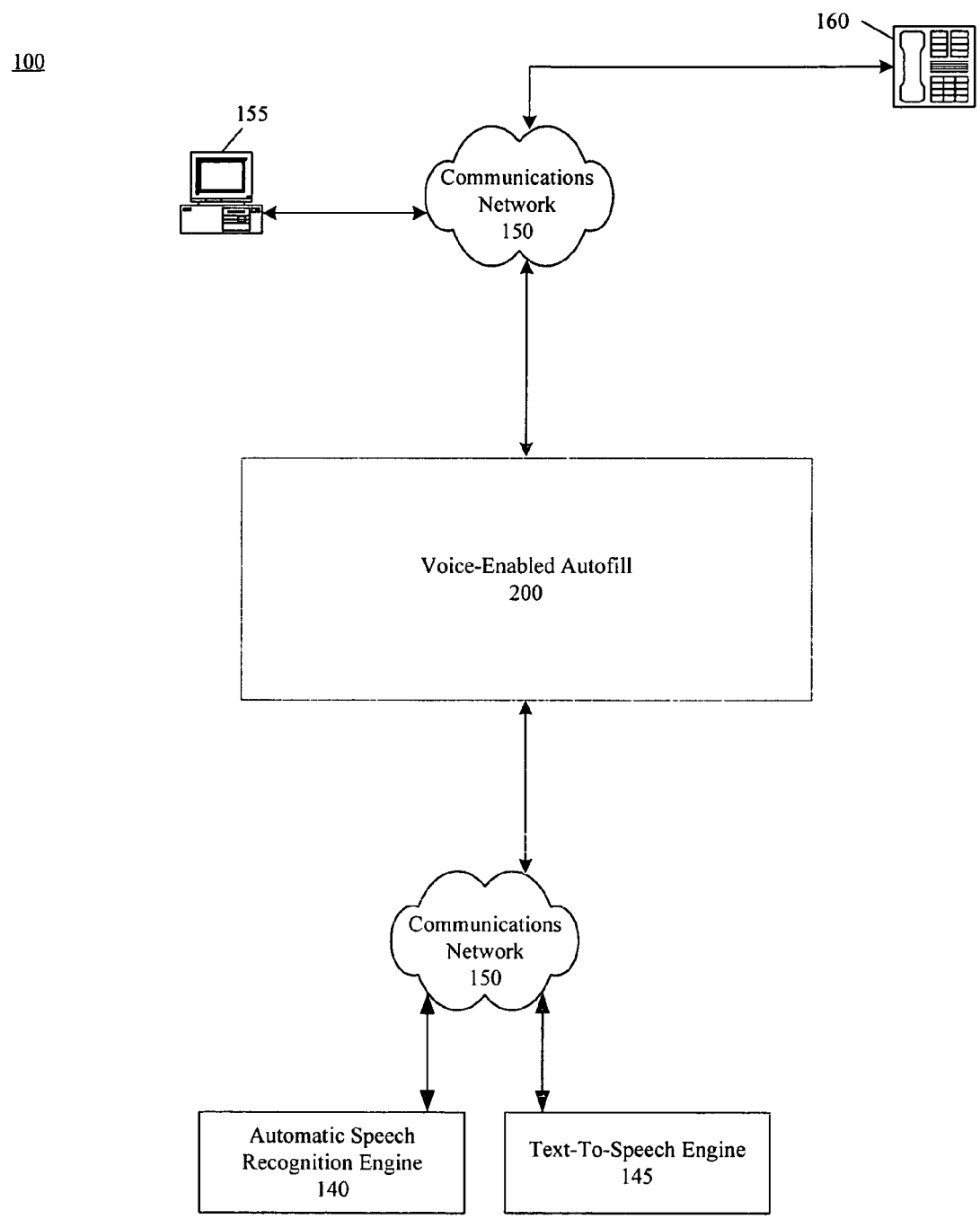
FIG. 1 is a schematic diagram illustrating a multimodal communication environment in which a system according to one embodiment of the present invention can be used.

FIG. 1 is a schematic diagram illustrating a multimodal communications environment 100 in which a system 200 for automatically filling a form field in response to a speech utterance can be used, according to the present invention. As illustrated, the multimodal communication environment 100 can include speech processing resources such as an automatic speech recognition (ASR) engine 140 and a text-to-speech (TTS) engine 145, each of which can electronically communicate with the system 200 via a communications network 150. The communications network 150 can include, but is not limited to, a local area network, a wide area network, the public switched telephone network, a wireless or mobile communications network, or the Internet. Illustratively, the system 200 is also able to electronically communicate via another or the same communications network 150 to a computer system 155 and to a telephone 160.

It will be readily apparent from the ensuing description that the illustrated multimodal communications environment 100 is but one type of multimodal communications environment in which the system 200 can be advantageously employed. Alternative multimodal communications environments, for example, can include various subsets of the different components illustratively shown.

Figure 2:
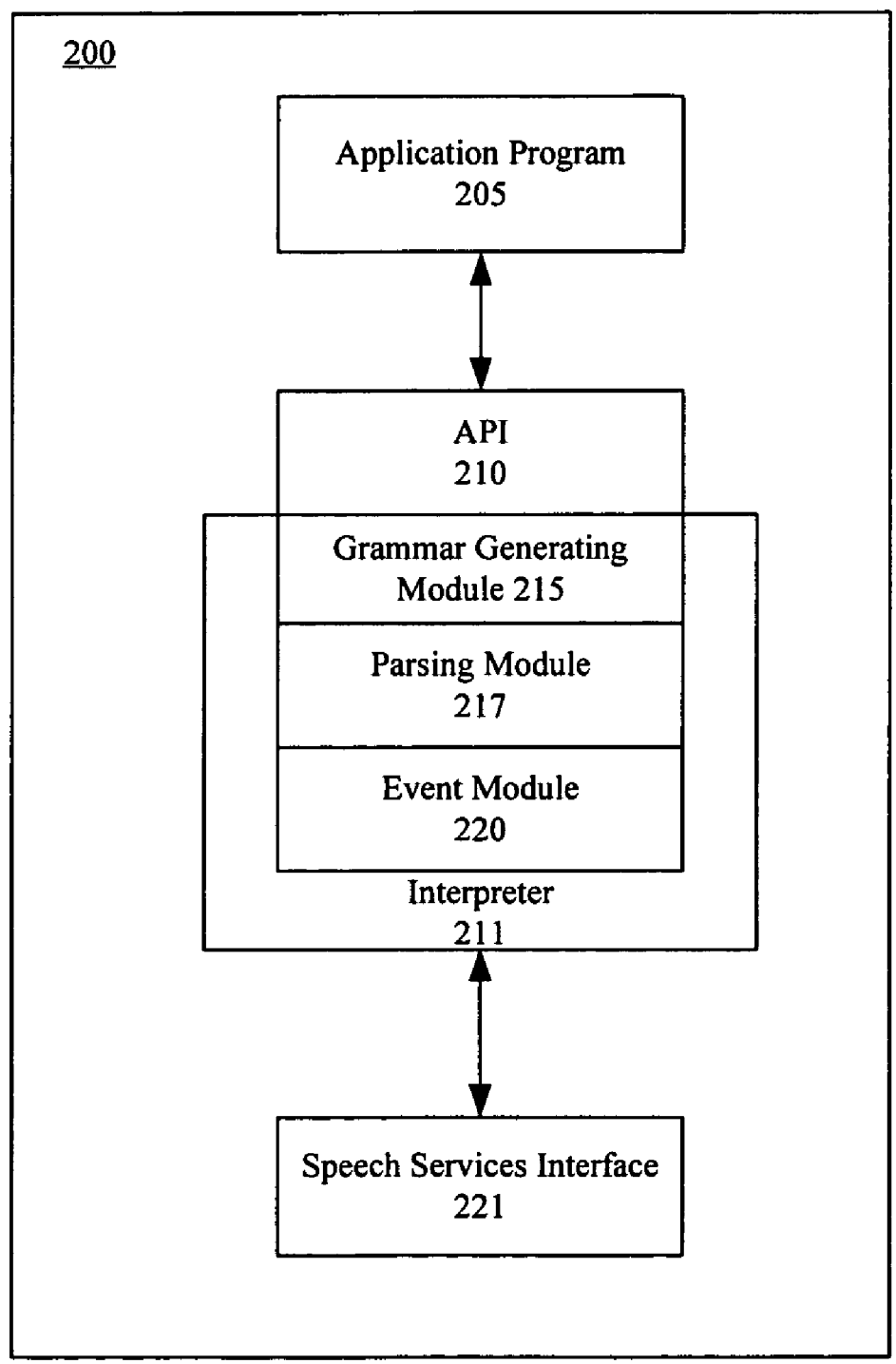
FIG. 2 is a schematic diagram of a system according to one embodiment of the present invention.

Referring additionally to FIG. 2, the system 200 illustratively includes an application program 205 and an application program interface (API) 210 through which the application program is linked to an interpreter 211. Within the interpreter 211, the system 200 also illustratively includes a grammar generating module 215, and an event module 220 that are connected via the API 210 to the application program 205. The grammar generating module 215 and the event module 220 can run in the same address space as the application 205. The system also includes a speech services interface 221 that connects to the speech browser. More generally, the speech services interface 221 can connect to any of various audio resources (not shown) such as an audio subsystem and speech processing resources such as an automatic speech recognition (ASR) engine and a text-to-speech (TTS) engine. The system 200, accordingly, can function as a server for hosting one or more applications such as a voice browser, interactive voice response system, voice server, or other type of application. For example, the application 205 can also function as a visual browser that is to be voice or speech enabled.

The system 200 additionally includes a parsing module 217 that parses a document written in a VoiceXML and determines whether the document contains a synchronized voice field in a user profile domain. The term synchronized voice field is used herein to denote a form field which is filled by the synchronizing of speech and graphic inputs. As described below, this synchronization results in the filling of the form field with graphic input in response to a speech input. The term user profile domain is used herein to denote those form fields that are to be filled with data corresponding to a user profile, the user profile denoting for example, personal data corresponding to the user. Such personal information can include the user's name, address and phone number Other types of data alternately be contained in the user profile and can be the subject of a voice-enabled auto-fill according without changing the present invention as described herein.

The user profile in the present context illustratively includes a Key, Label Phrase, and Value, as shown by the representative user profile scheme in Table 1.

TABLE 1

| KEY | LABEL PHRASE | VALUE |
| --- | --- | --- |
| "firstname" | "my first name" | "Gerald" |
| "lastname" | "my last name" | "McCobb" |
| "address" | "my address" | "8051 Congress Avenue" |

The API 210 provides a VoiceXML field grammar that implements a synchronization element, such as the X+V <sync> element. The synchronization element implemented by the VoiceXML field grammar synchronizes the value property of a graphic input control, such as an XHTML input control, with the synchronized voice field. As noted above, in the present context, the synchronized voice field defines the form field that is to be automatically filled, or auto-filled, by the system 200.

Figure 3:
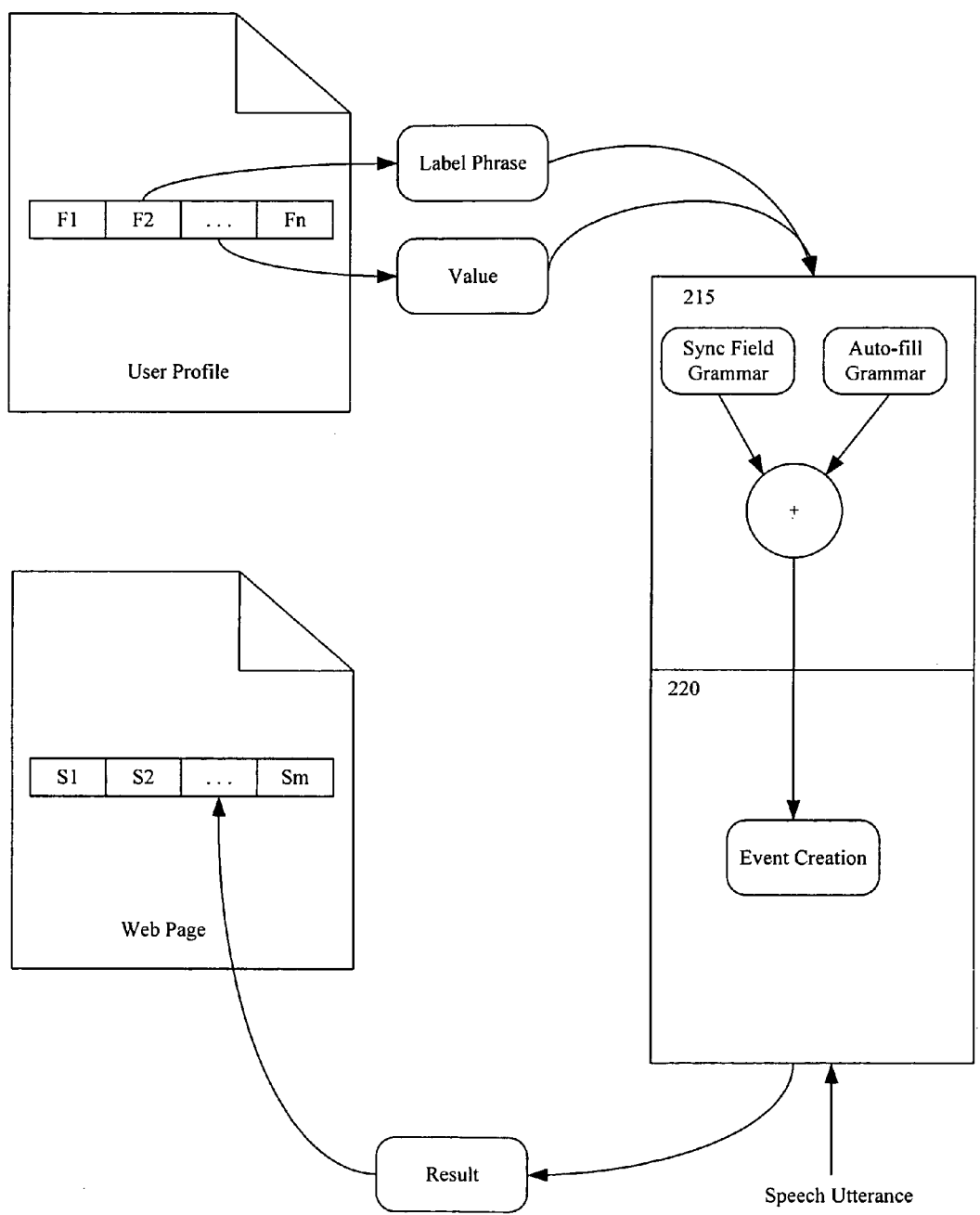
FIG. 3 is a schematic diagram of operations performed by the system of FIG. 2.

The grammar-generating module 215 can comprise a VoiceXML interpreter. As illustrated in FIG. 3, the grammar-generating module 215 obtains from the user profile the label phrase and corresponding value that is to be auto-filled in a particular one of the identified form fields. The grammar-generating module 215 generates an additional grammar, denoted as an auto-fill grammar, based upon the label phrase and having semantic interpretation (SI) string or tag that contains the value corresponding to the label phrase. The grammar-generating module performs this operation for each form field identified by the parsing module 217 as a synchronized voice field in the user profile domain. Thus, the grammar-generating module 215 generates an auto-fill grammar corresponding to each synchronized voice field defining a form field, the grammar being based on the user profile and including the SI string or tag.

When one of the form fields so identified is accessed by a form interpretation algorithm (FIA), the grammar-generating module 215 enables the auto-fill grammar along with the VoiceXML field grammar provided by the API 210. When the auto-fill grammar and the VoiceXML field grammar are enabled, the event module 220 creates an auto-fill event based upon the grammars. The event is configured to respond to a speech utterance.

The auto-fill event, in response to the speech utterance, causes an execution of the SI string or tag so that the result of the execution is the value corresponding to the label. The auto-fill event causes the result to be propagated, and the synchronization element implemented by the VoiceXML field grammar fills in the form field of the Web page with the result of the SI string or tag execution. Accordingly, the event causes the form field to be filled with the value contained in the semantic interpretation string in response to the speech utterance.

Figure 4:
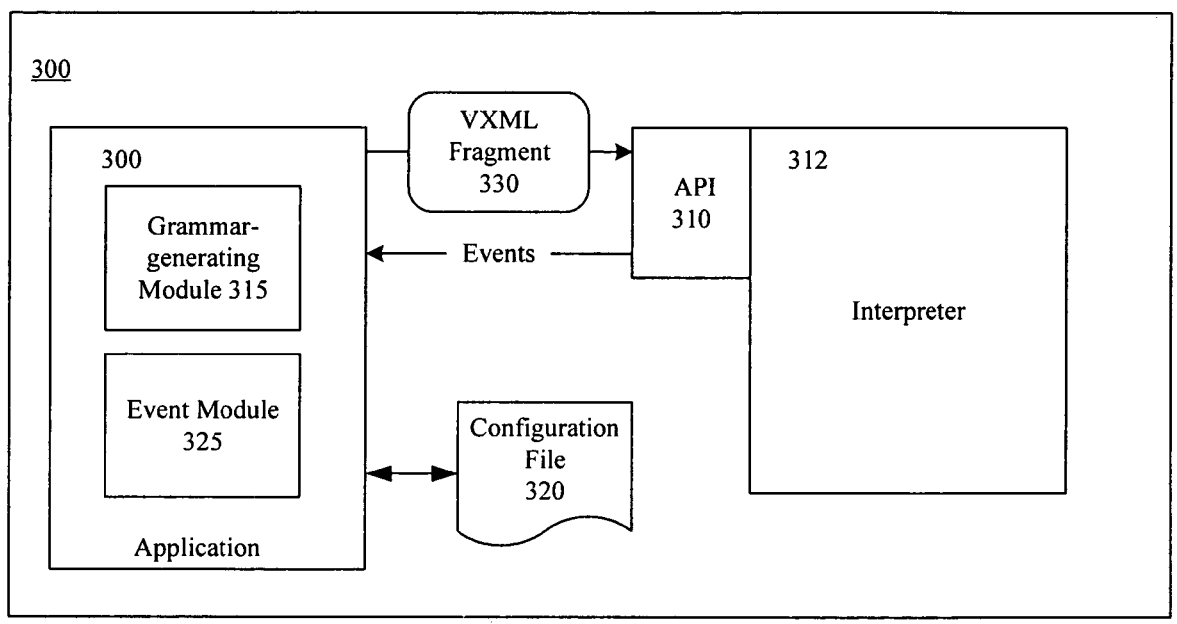
FIG. 4 is a schematic diagram of a system according to another embodiment of the present invention.

FIG. 4 is a schematic diagram of a system 300 for automatically filling a form field in response to a speech utterance according to another embodiment of the present invention. The system includes an application program 305 and an interpreter 312, the application program and interpreter being connected via an API 310. The system also includes a grammar-generating module 315 and an event module 325. As illustrated, the a grammar-generating module 315 and an event module 325 are part of the interpreter 312.

The application program 305 can generate and pass a VoiceXML fragment 330 to the interpreter 312. The VoiceXML fragment 330 can specify a grammar that can be used to process received speech utterances. In case multiple devices are enabled for multimodal interaction, a configuration file 320 can be optionally included to specify one or more different devices such as a telephone, mobile phone, home security system, dashboard audio/communication system, computer system, portable computer system. Within the configuration file 320, each device can be assigned an identifier that uniquely identifies that device. In one embodiment, prior to registering the VoiceXML fragment 330 with the interpreter 312, the application 305 can access the configuration file 320 to obtain the identity of the device being used.

The system 300 utilizes a command, control, and content navigation markup language (C3N), in which the application program 305 registers a VoiceXML link, based upon C3N grammars, such as a VoiceXML <link>, with the interpreter 312. Events generated by matching grammars in the link are propagated back to the application program 305 as shown. By specifying one or more link elements, based upon C3N grammars and denoted C3N link grammars, speech inputs to the application 305 can be matched. That is, the interpreter 312 can match speech inputs received from the application 305 with the C3N link grammars. Upon detecting a match, the interpreter 312 can generate one or more events that are sent back to the application 305.

Figure 5:
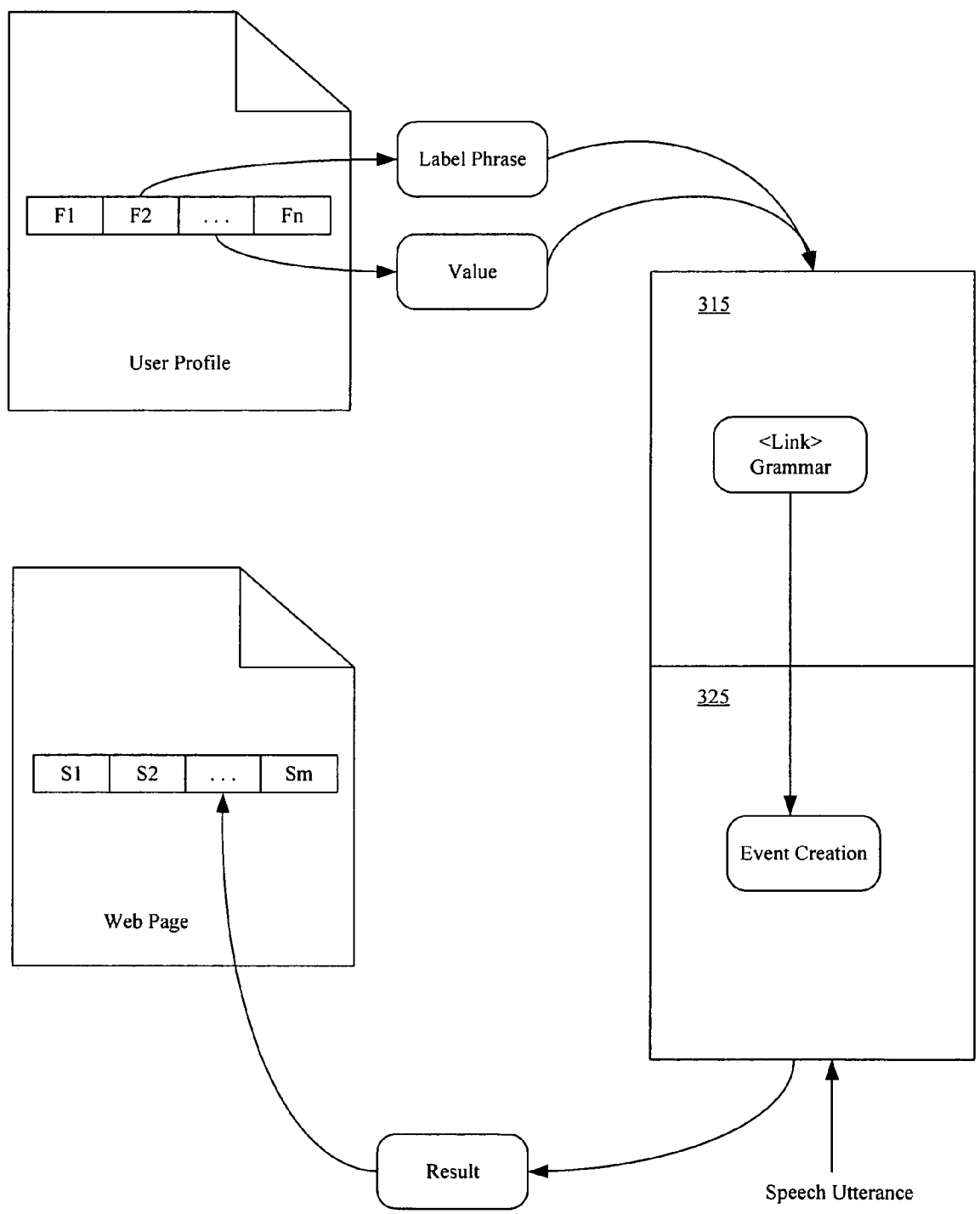
FIG. 5 is a schematic diagram of operations performed by the system of FIG. 4

More particularly, as illustrated in FIG. 5, a C3N link grammar is generated by the grammar-generating module 315 when an auto-fill is required. The C3N link grammar is based upon the user profile. The application program 305 then instructs the interpreter 312 to add the C3N link grammar. The C3N link grammar causes the event module 325 to create an auto-fill event. When executed in response to a speech utterance the event causes the form field to be filled by graphic input from the user profile.

For example, assuming the same user profile as set forth above, the following VoiceXML-based application uses the Key, Label Phrase, and Value elements to generate a grammar in accordance with this embodiment:

```
<vxml:link eventexpr+"application.lastresult$.interpretation.c3n>
    <grammar>
        <![CDATA[
        #JSGF V1.0
        grammar user_profile;
        public <user_profile> + Browser fill [my]
            (
            first name {$.c3n = "command.autofill.firstname";}
            I last name {$.c3n = "command.autofill.lastname";}
            I street address {$.c3n = "command.autofilladress";}
            )
            ;
        ]]>
    </grammar>
</vxml:link>.
```

The grammar is built using the label phrases and corresponding keys, which are included in a portion of a corresponding SI string or tag. The grammar is illustratively constructed so as to match a phrase such as "fill my street address." The VoiceXML link in response to the speech utterance causes an event to be propagated. The system 300 responds to the event, which is interpreted as an auto-fill command, by searching the user profile to obtain the value for the address. The result is that the form field is auto-filled with the value "8051 Congress Avenue."

Figure 6:
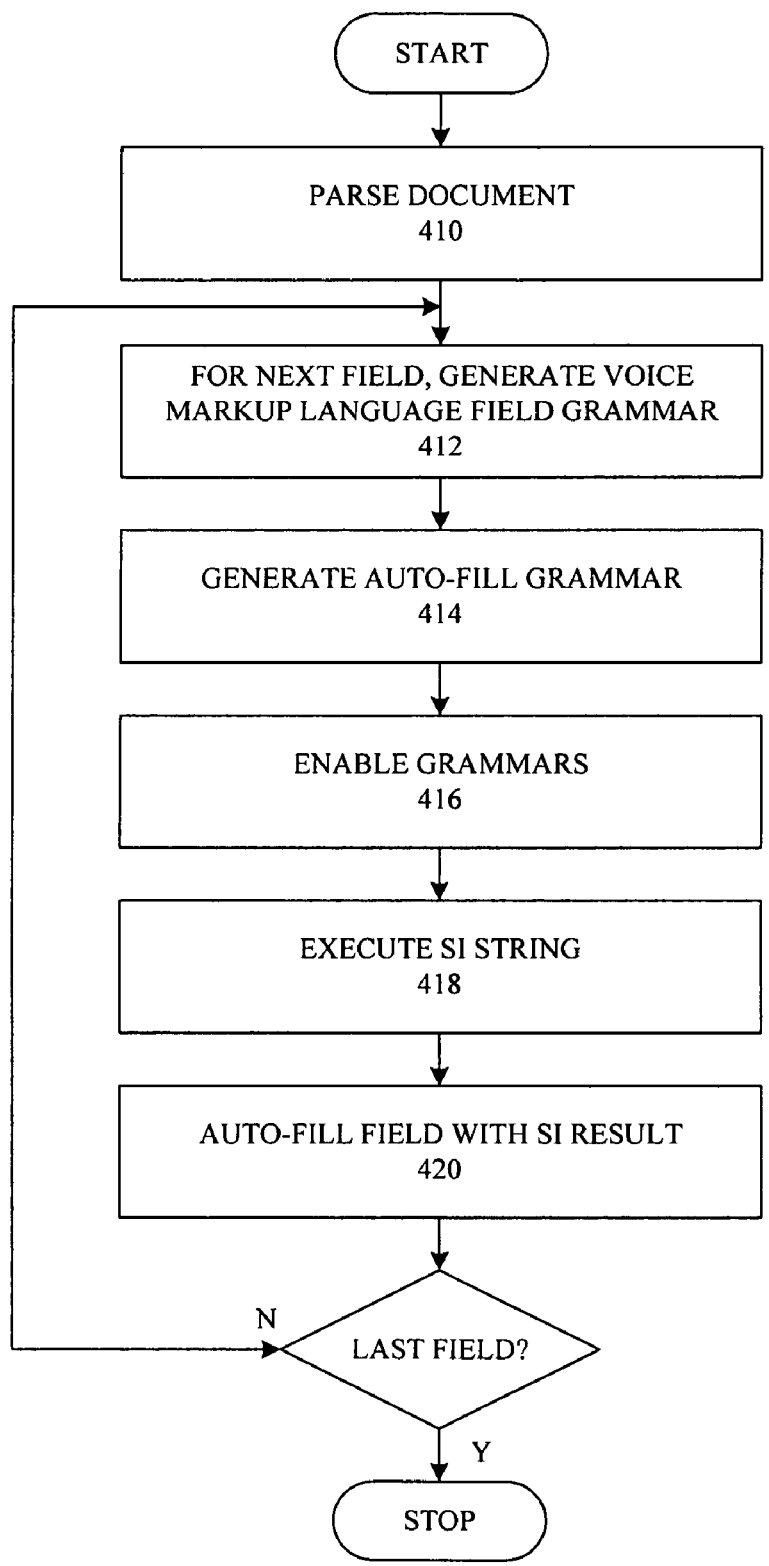
FIG. 6 is a flowchart illustrating a method according to one embodiment of the present invention.

FIG. 6 provides a flowchart illustrative of a method 400 according to yet another embodiment of the present invention. The method 400 begins at step 410 in which a document is parsed to determine whether to determine whether an X+V document contains a synchronized voice field in a user profile domain. For each field, a VoiceXML field grammar is generated at step 412.

At step 414, an auto-fill grammar is generated based upon the label phrase and corresponding value of a user profile, the value being contained in an SI string or tag. The VoiceXML field grammar and the auto-fill grammars are enabled at step 416. In response to a speech utterance, the SI string is executed so that the result is the value contained in the SI string or tag at step 418. A visual field, at step 420, is auto-filled with the result.

Figure 7:
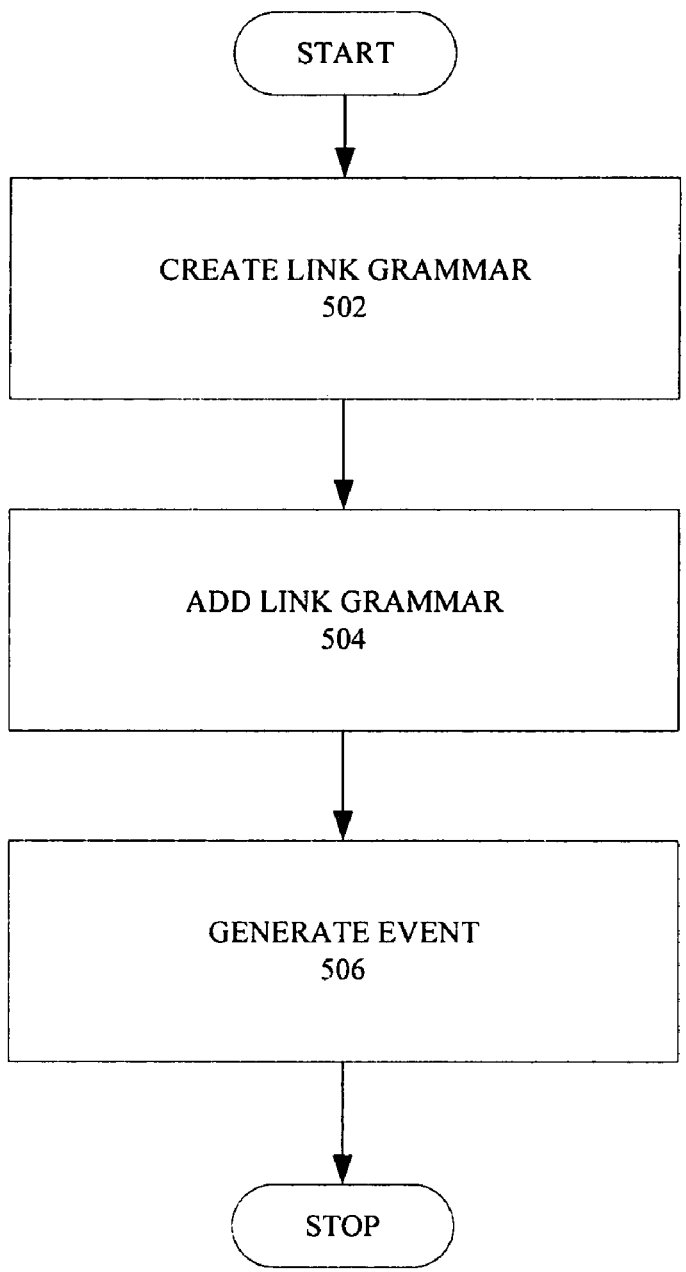
FIG. 7 is a flowchart illustrating a method according to another embodiment of the present invention.

FIG. 7 provides a flowchart illustrative of a method 500 according to still a different embodiment of the present invention. In step 502, a link grammar with fields corresponding to the user profile is created. The link grammar is added by an interpreter at step 504. The link generates an event at step 506 in response to a speech utterance and when a field in a page has focus.

The present invention can be realized in hardware, software, or a combination of hardware and software. The present invention can be realized in a centralized fashion in one computer system, or in a distributed fashion where different elements are spread across several interconnected computer systems. Any kind of computer system or other apparatus adapted for carrying out the methods described herein is suited. A typical combination of hardware and software can be a general purpose computer system with a computer program that, when being loaded and executed, controls the computer system such that it carries out the methods described herein.

The present invention also can be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

This invention can be embodied in other forms without departing from the spirit or essential attributes thereof. Accordingly, reference should be made to the following claims, rather than to the foregoing specification, as indicating the scope of the invention.

The invention claimed is:

1. A computer-implemented method of automatically filling a form field in response to a speech utterance in a multimodal communications environment having a Web browser implementing a XHTML+VXML (X+V) markup language, the method comprising:

parsing an X+V document to determine a synchronized voice field in a user profile domain, wherein a synchronized voice field refers to a form field that is filled by a synchronization of speech and graphic inputs, and a user profile domain refers to form fields that are to be filled with data corresponding to a user profile;

for each determined synchronized voice field, dynamically generating at least one grammar corresponding to the form field at runtime, the at least one grammar being based on a user profile and comprising a semantic interpretation string; and creating an auto-fill event based upon the at least one grammar and responsive to the speech utterance, the auto-fill event causing the filling of the form field with data corresponding to the user profile and comprising at least some data not in the spoken utterance.

2. The method of claim 1, wherein the data which fills the form field is retrieved from a record of a table specific to the user profile, the record establishing an association between the data and the speech utterance.

3. The method of claim 1, wherein the data which fills the form field includes information other than that contained within a speech-to-text conversion of the speech utterance.

4. The method of claim 1, wherein the generating step comprises generating at least one grammar defining a form field grammar corresponding to the synchronized voice form field.

5. The method of claim 4, the generating step comprising additionally generating an auto-fill grammar based upon a label phrase and a value contained in the semantic interpretation string.

6. The method of claim 5, wherein the auto-fill event causes the form field to be filled with the value contained in the semantic interpretation string in response to the speech utterance.

7. The method of claim 1, the generating step comprising generating at least one of a voice command and control grammar and a content navigation grammar.

8. The method of claim 1, wherein the wherein the form field is a form field of a voice markup language document, and wherein the generating step comprises generating at least one grammar defining a link grammar corresponding to the form field.

9. An apparatus for automatically filling a form field in response to a speech utterance in a multimodal communications environment having a Web browser implementing a XHTML+VXML (X+V) markup language, the apparatus comprising a combination of hardware and software that implements:

a parsing module for parsing an X+V markup language document to determine whether the X+V markup language document contains a synchronized voice field refers to a form field that is filled by a synchronization of speech and graphic inputs, and a user profile domain refers to form fields that are to be filled with data corresponding to a user profile;

a grammar-generating module for dynamically generating at least one grammar corresponding to each determine synchronized voice field at runtime, the at least one grammar being based on a user profile and comprising a semantic interpretation string; and an auto-fill event module for creating an auto-fill event based upon the at least one grammar and responsive to the speech utterance, the auto-fill event causing the filling of the form field with data corresponding to the user profile and comprising at least some data not in the spoken utterance.

10. The apparatus of claim 9, wherein the grammar-generating module comprises a voice markup language interpreter for generating at least one grammar defining a form field grammar corresponding to the synchronized voice form field.

11. The apparatus of claim 10, wherein the voice markup language interpreter additionally generates an auto-fill grammar based upon a label phrase and a value contained in the semantic interpretation string.

12. The apparatus of claim 11, wherein auto-fill event causes the form field to be filled with the value contained in the semantic interpretation string in response to the speech utterance.

13. The apparatus of claim 9, wherein the grammar-generating module comprises a browser configured to generate a voice markup language link grammar.

14. The apparatus of claim 13, wherein the auto-fill event is a voice markup language auto-fill event responsive to the link grammar and that causes the browser to fill the form field with data corresponding to the user profile.

15. A computer-readable storage medium for use in a data communications network, the computer-readable storage medium comprising computer instructions for parsing an X+V document to determine a synchronized voice field in a user profile domain, wherein a synchronized voice field refers to a form field that is filled by a synchronization of speech and graphic inputs, and a user profile domain refers to form fields that are to be filled with data corresponding to a user profile;

for each determined synchronized voice field, dynamically generating at least one grammar corresponding to the form field at runtime, the at least one grammar being based on a user profile and comprising a semantic interpretation string; and creating an auto-fill event based upon the at least one grammar and responsive to the speech utterance, the auto-fill event causing the filling of the form field with data corresponding to the user profile and comprising at least some data not in the spoken utterance.

16. The computer-readable storage medium of claim 15, wherein the data which fills the form field is retrieved from a record of a table specific to the user profile, said record establishing an association between the data and the speech utterance, and wherein the data which fills the form field includes information other than that contained within a speech-to-text conversion of the speech utterance.

17. The computer-readable storage medium of claim 15, wherein the generating instruction comprises a computer instruction for generating at least one grammar defining a form field grammar corresponding to the synchronized voice form field.

* * * * *